US007488941B2

(12) United States Patent
Lee et al.

(10) Patent No.: US 7,488,941 B2
(45) Date of Patent: Feb. 10, 2009

(54) DECORATIVE LIGHTING FIXTURE WITH HIDDEN MOTION DETECTOR

(75) Inventors: Wade Lee, Danville, CA (US); Donald R. Sandell, San Jose, CA (US)

(73) Assignee: EML Technologies LLC, Danville, CA (US)

( * ) Notice: Subject to any disclaimer, the term of this patent is extended or adjusted under 35 U.S.C. 154(b) by 84 days.

(21) Appl. No.: 11/428,540

(22) Filed: Jul. 3, 2006

(65) Prior Publication Data

US 2008/0001071 A1 Jan. 3, 2008

(51) Int. Cl.
*G01J 5/02* (2006.01)

(52) U.S. Cl. ........................ 250/342; 250/353; 250/347; 362/276

(58) Field of Classification Search ................. 250/342, 250/353, 347, 357; 362/276
See application file for complete search history.

(56) References Cited

U.S. PATENT DOCUMENTS

| | | | | |
|---|---|---|---|---|
| 2,198,725 | A * | 4/1940 | Smith | 250/338.1 |
| 4,275,303 | A * | 6/1981 | Mudge | 250/342 |
| 5,282,118 | A | 1/1994 | Lee | |
| 5,434,764 | A | 7/1995 | Lee et al. | |
| 5,442,532 | A | 8/1995 | Boulos et al. | |
| 5,575,557 | A | 11/1996 | Huang et al. | |
| 5,590,953 | A | 1/1997 | Haslam et al. | |
| 5,626,417 | A * | 5/1997 | McCavit | 362/276 |
| D382,082 | S | 8/1997 | Huang et al. | |
| 5,717,203 | A | 2/1998 | Yung | |
| 5,757,004 | A | 5/1998 | Sandell et al. | |
| 5,936,666 | A * | 8/1999 | Davis | 348/143 |
| 6,348,691 | B1 | 2/2002 | Sandell et al. | |
| 6,376,840 | B1 | 4/2002 | Ko | |
| 6,943,687 | B2 | 9/2005 | Lee et al. | |

* cited by examiner

*Primary Examiner*—Georgia Y Epps
*Assistant Examiner*—Tony Ko
(74) *Attorney, Agent, or Firm*—Elliot B. Aronson

(57) ABSTRACT

A motion-activated decorative lighting fixture with a PIR motion detector hidden behind a decorative slotted wall of the fixture body. The motion-activated decorative lighting fixture includes a motion detector housing that forms an integral part of the lighting fixture body. The housing includes a slotted vertically extending exterior wall around the housing with an array of elongate vertically extending slots horizontally spaced apart from one another and extending along at least a portion of the wall. One or more PIR sensors are disposed within the housing, and a segmented Fresnel lens array is disposed within the housing behind the slots to direct infra-red energy from a monitored field of view to a sensor. The lens array includes a plurality of columns of lenslets, at least a portion of which have at least two lenslets disposed one above the other. Each column is aligned with a corresponding slot so as to direct infra-red energy from a monitored zone passing through the corresponding slot to a sensor. The configuration defines an optical path for infra-red energy emanating from a detection zone in the field of view, the optical path passing through a given slot and a lenslet aligned with the slot and on to a PIR sensor.

8 Claims, 3 Drawing Sheets

DECORATIVE LIGHTING FIXTURE WITH HIDDEN MOTION DETECTOR

BACKGROUND OF THE INVENTION

The present invention relates to passive infra-red motion detectors of the type used in residential outdoor lighting fixtures, for example, to illuminate a walkway or driveway when a person or automobile approaches. The invention is more particularly directed to a decorative lighting fixture in which the motion detector is inconspicuously hidden in a decorative element on the lighting fixture body.

Lighting fixtures that are activated by passive infra-red (PIR) motion detectors have been available for a long time. PIR motion detectors were first used in the lighting field with utilitarian lighting such as flood lights or other area lighting. With the development of the flexible plastic segmented Fresnel lens, PIR motion detectors were then used in connection with decorative lighting fixtures. At first the motion detector was located in a protruding housing on the so-called backplate used for mounting the decorative fixture on a wall. In recent years attempts have been made to integrate a PIR motion detector into the decorative body of the fixture itself to make the motion detector less obtrusive either by concealing the motion detector altogether or at least by giving it a decorative appearance so that it does not detract appreciably from the ornamental style of the lighting fixture. Examples of PIR lighting fixtures that endeavor either to conceal the motion-detecting unit or to embellish it so as to enhance its decorative appearance may be seen in the following U.S. Pat. Nos. 5,282,118 and 5,434,764 to Lee et al.; 5,575,557 and Des. 382,082 to Huang et al.; 5,590,953 to Haslam et al.; 5,626,417 to McCavit; 6,348,691 to Sandell et al; and 6,943,687 to Lee et al. These hidden motion detectors are not amenable to being readily included in certain decorative fixture styles, or it is not cost effective to do so.

SUMMARY OF THE INVENTION

The present invention provides a motion-activated decorative lighting fixture with a PIR motion detector hidden behind a decorative wall of a sort commonly found in decorative fixture styles. Briefly, a motion-activated decorative lighting fixture according to the invention includes a motion detector housing that forms an integral part of the lighting fixture body. The housing includes a vertically extending exterior wall around the housing that is generally cylindrical and is often of circular cross section although other shapes may also be used. The wall has an array of elongate vertically extending slots through it that are horizontally spaced apart from one another and extending along at least a portion of the wall. Such a slotted wall derives from the chimneys or flues found in oil lamps or other fuel-burning lamps from an earlier age and are common in decorative fixtures today. One or more PIR sensors are disposed within the housing, and a segmented Fresnel lens array is disposed within the housing behind the slots to direct infra-red energy from a monitored field of view to a sensor. The lens array includes a plurality of columns of lenslets, at least a portion of which have at least two lenslets disposed one above the other. Each column is aligned with a corresponding slot so as to direct infra-red energy from a monitored zone passing through the corresponding slot to a sensor. The configuration defines an optical path for infra-red energy emanating from a detection zone in the field of view, the optical path passing through a given slot and a lenslet aligned with the slot and on to a PIR sensor.

It is a feature of the invention that it can use the commonly found decorative slot arrays as part of a motion detector while preserving the decorative appearance and hiding the motion detector from view. It is an object of at least some embodiments of the invention to provide a hidden motion detector in a decorative slotted fixture element that is amenable to cost-effective manufacture.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
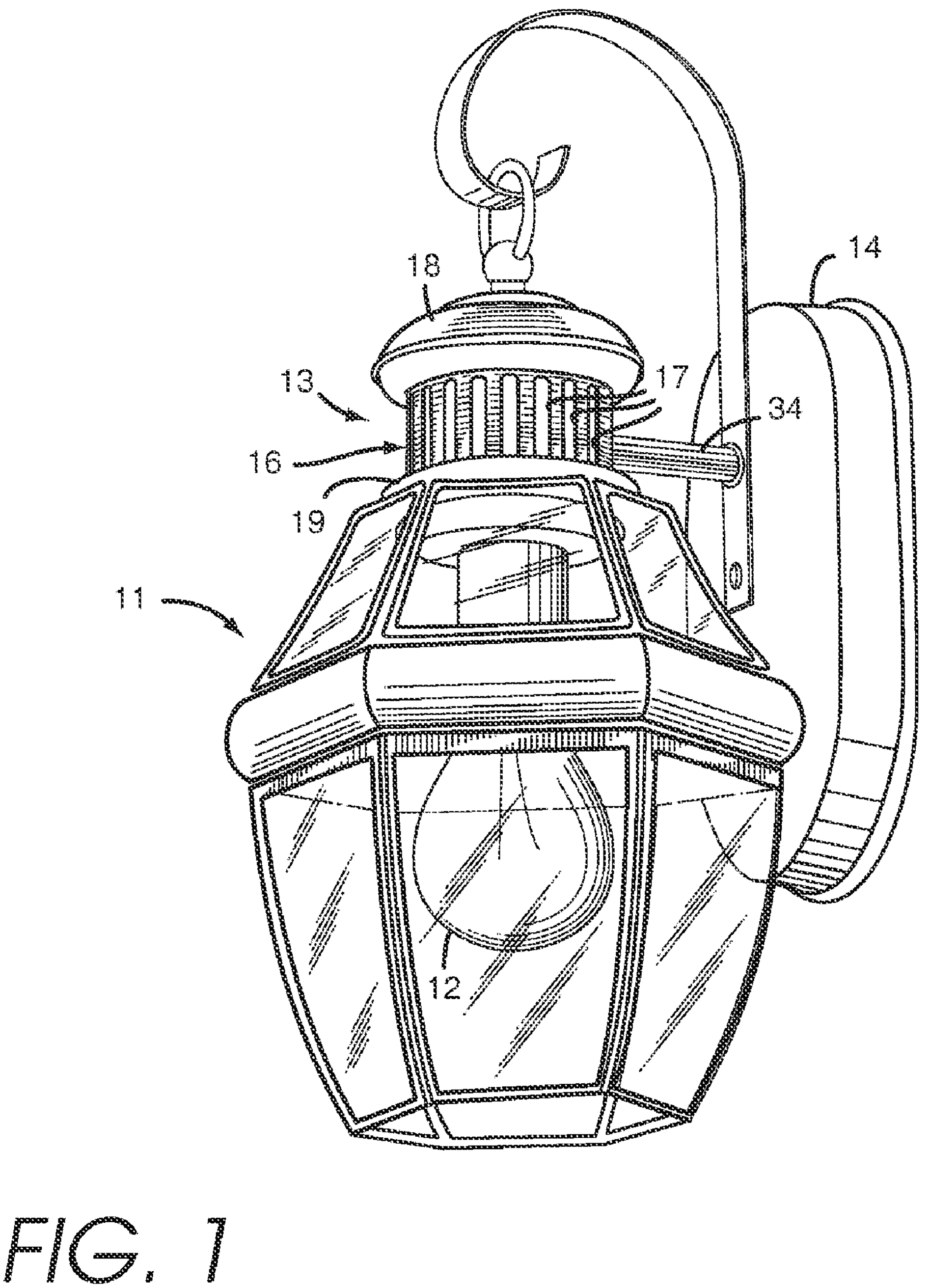
FIG. 1 is an overall perspective view of a decorative lighting fixture with a motion detector hidden therein in accordance with an embodiment of the invention.

FIG. 1 shows an embodiment of a decorative lighting fixture in which a motion detector has been hidden without disrupting the decorative style of the fixture. The fixture includes a stylish globe assembly 11 which contains the light bulb 12. The globe assembly extends down underneath a decorative element, indicated generally at reference numeral 13, which serves here as a housing for the hidden motion detector. The fixture is mounted on an exterior wall of a house or other structure by mounting backplate 14. The decorative element 13 pictured in FIG. 1 has a form sometimes referred to figuratively as a "cupola" or sometimes as a "chimney." It is characterized by a vertically extending exterior wall 16 running around the element, which has an array of elongate vertically extending slots 17 through it. The slots are horizontally spaced apart from one another and extend along at least a portion of the wall, and in some designs may run all the way around the wall. Decorative element 13 derives its form historically from the vented flue or chimney-like elements that were present in oil lamps or other fuel-burning lamps of the past, in which apertures like the apertures 17 served as vents for heat and fumes as well as for overall air flow through the lamp. Although the vents are no longer needed in present-day electric lighting fixtures, the structure nevertheless remains today as a stylistic embellishment to the lighting fixture design. In the embodiment of FIG. 1 the decorative motion detector housing is bounded above and below by decorative members 18 and 19. The structures terminating motion detector wall 16 above and below do not themselves play any significant role in the operation of the motion detector and can take other forms than illustrated here. The slotted wall 16 can even comprise just a section of a longer, vertically extending, generally cylindrical wall. Though shown here on top of the globe assembly, in other fixture designs the motion detector housing can also be positioned below the globe assembly.

In general, a motion detector housing as used with the present invention is disposed to form an integral part of the lighting fixture and may be shaped to have a variety of decorative external appearances. As used herein “an integral part of” or “integral to” the lighting fixture is intended to mean incorporated into the fixture itself so as to form a harmonious part of the fixture design, as opposed to being independently mounted or being an inharmonious, stand-apart adjunct to the fixture. Thus, “integral” to the fixture is intended to distinguish a motion detector located in the fixture itself from one mounted separately on the backplate or otherwise separately mounted.

The slots 17 may have a variety of shapes other than that illustrated in FIG. 1, but they will generally be elongate in shape with the long dimension oriented up and down. The slots effectively serve as individual viewing windows through which the motion detector looks out onto the monitored field of view. The slots in FIG. 1 are shown with rounded ends for stylistic purposes, but could also take on other decorative shapes, for example, an elliptical shape, or the sides could have a curved-bracket shape ({ }), or the slots could be rectangular, which may be desirable in some models to maximize the viewing area for each slot. The wall 16 in FIG. 1 is cylindrical in shape with a circular horizontal cross section, but can likewise take on other decorative shapes. For example, the wall could also be formed with slightly curving walls so as to bulge outward somewhat in the midregion of the slots or so as to be somewhat constricted at the midregion. The wall is also not restricted to a circular transverse cross section, but could have other shapes, for example, with a square, hexagonal or other polygonal cross section.

Figure 2:
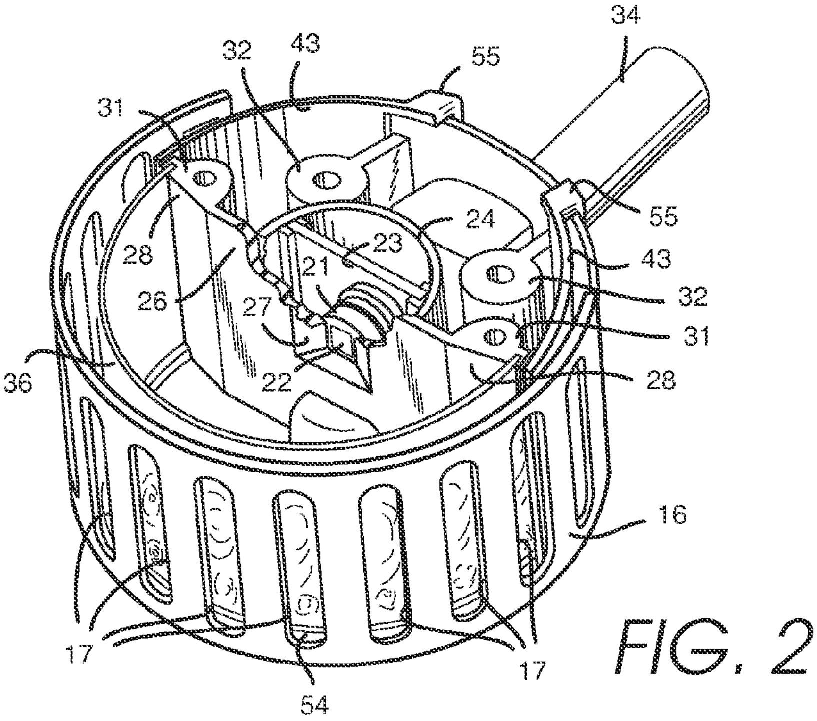
FIG. 2 is a perspective view of the motion detector housing from FIG. 1 with the top removed and partially cut away to reveal the motion detector components.

FIG. 2 shows the internal configuration of the motion detector housing of FIG. 1. In this embodiment the array of slots 17 extends more than 180 degrees around wall 16. A single PIR sensor 21 with sensor viewing window 22 is mounted on a printed circuit board 23. The internal support structure includes a rear wall 24, which forms the back of a chamber for the printed circuit board and provides sufficient room behind the printed circuit board for electrical connections and, if necessary, a small number of circuit components. A front partition 26 defines a window 27 that frames the viewing window 22 of the sensor. In FIG. 2 the partition is partially cut away to show sensor 21 and printed circuit board 23 more clearly. The outer reaches, or wings 28, of partition 26 are angled back from the side-to-side direction to permit a greater field of view angle—that is, to permit infra-red energy to enter the housing from a zone extending back somewhat greater than 90 degrees from the forward direction. Posts 31 and 32 are provided for securing a cover to the internal support structure and for separately securing a decorative element such as the decorative top member 18 above the motion detector housing.

Electrical power to the light fixture and to the printed circuit board is provided through conduit 34 passing through external wall 16. In the illustrated embodiment the electrical leads for energizing the light bulb pass through the conduit and are directed down to the lamp socket. Low-voltage leads for energizing the sensor also pass through the conduit and down towards the socket, but then are diverted up through a central hole 35 in the internal bottom of the housing (see FIG. 5) into the region behind printed circuit board 23 for connection to the sensor and any other electrical components.

Figure 3:
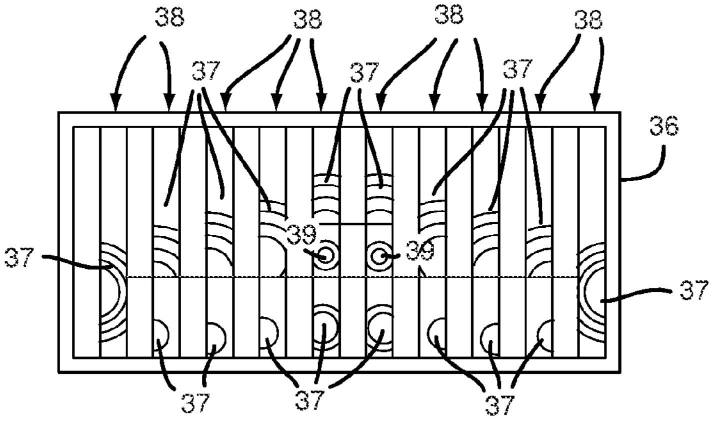
FIG. 3 is a diagrammatic view of a segmented Fresnel lens for use in the embodiment of FIG. 1.

A segmented Fresnel lens array 36 is also mounted in the motion detector housing and is shaped generally to follow the shape of wall 16. Lens array 36 is formed with a plurality of Fresnel lenslets 37 distributed over the array so as to line up in a plurality of columns 38. FIG. 3 shows an example Fresnel lens array, in which most of the columns include at least two lenslets disposed one above the other so as to form two horizontal rows of lenslets. In accordance with known practice, each horizontal row of lenslets monitors a different level of vision in the field of view. Thus, a lens array with two lenslets in each column will monitor two levels of vision, one far and one near, in all directions in the monitored field of view. In FIG. 3 the lens array lies flat, but when lens array 36 is in position in the motion detector housing, the columns 38 are aligned with corresponding slots 17. The lenslets of each column are disposed to direct infra-red energy from a detection zone being monitored and passing through the corresponding slot to sensor 21. The upper and lower horizontal rows of lenslets monitor far and near ranges, respectively, in the field of view of the motion detector. To take full advantage of the full width of a column of Fresnel lenslets, it is desirable that the width of slots 17 be slightly greater than the width of the lenslet column. This will allow for the natural variations in dimensions that occur in the formation of the slots in wall 16 due to manufacturing tolerances and will diminish any collimating effect the thickness of the slots may have. It is not necessary that all slots have corresponding lenslet columns associated with them. For decorative purposes it may be desirable in some styles for the slots to continue around the wall beyond the point where it is desired to monitor for motion.

In some motion detector configurations it is desirable for all the lenslet columns to include at least two lenslets so that each slot 17 monitors at least two levels of vision. In the example of FIG. 3 most of the columns include two lenslets, but the two end columns each include only a single lenslet, and the two centermost columns include three lenslets. In some sensor configurations the sensor may be only weakly responsive to infra-red energy coming from the wings of a 180-degree field of view. In this situation it may be desirable to form only a single lenslet in the corresponding lens array column as shown in FIG. 3 so that the full height of the column can be used to concentrate a greater amount of radiant energy onto the sensor. In a single sensor configuration, in which the sensor looks straight ahead and is most sensitive to infra-red energy coming from the straight-ahead direction, it may be desirable to include extra lenslets in the straight-ahead columns to monitor a third level of vision as shown at central lenslets 39 in FIG. 3.

It is of note here that the use of decorative slots 17 as viewing windows for the motion detector does not impair the ability of the detector to monitor a full 180-degree field of view or more. The precise field of view monitored depends on the angular extent of the slots, as well as on such other factors as the angular responsiveness of the sensors, the area and substrate material of the lenslets, and the overall configuration of the slots, lenslets, sensors and any other intervening mirrors or supplemental optical elements. Nevertheless, for any given embodiment the array of slots has to extend sufficiently far around the wall 16 in order that the motion detector achieve a 180-degree field of view. In practice, the array of slots need only extend somewhat less than 180 degrees and the motion detector can still be configured to monitor a full 180-degree field of view due to the focusing of incident infra-red energy passing through the far slots. Such an angular extent of the slot array is referred to herein as “about 180 degrees.”

Figure 4:
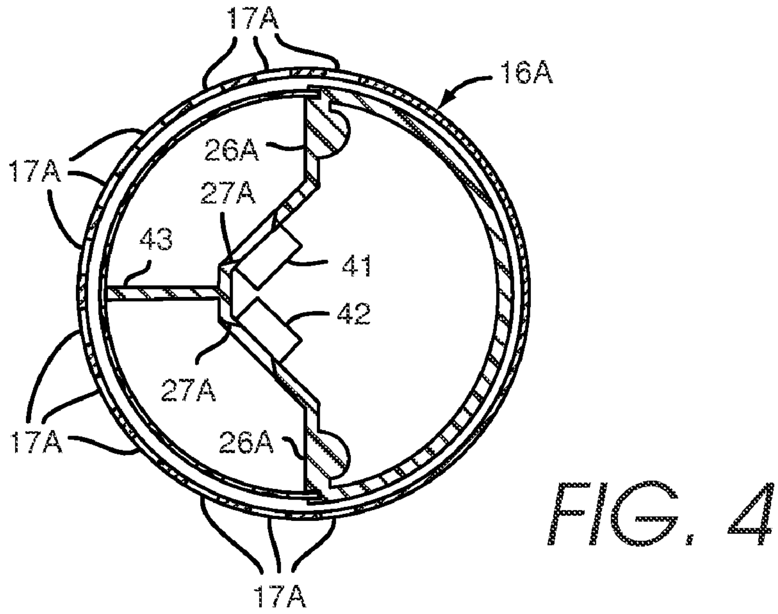
FIG. 4 is a sectional view of an alternative embodiment of motion detector with two sensors.

Although FIG. 2 illustrates only a single sensor 21, in some embodiments it may be desirable to use two or more sensors, for example, where a wider field of view or greater sensitivity from side zones is desired. FIG. 4 shows a simple arrangement with two sensors 41 and 42 arranged to monitor opposite sides of the field of view. Here like parts are given like reference numerals with the letter "A" appended to indicate these parts in the configuration of FIG. 4. The internal support structure includes a central partition 43 to isolate the two sensors from one another. This configuration is shown only by way of example, and given the teachings herein, the skilled practitioner will readily be able to devise other suitable configurations.

Figure 5:
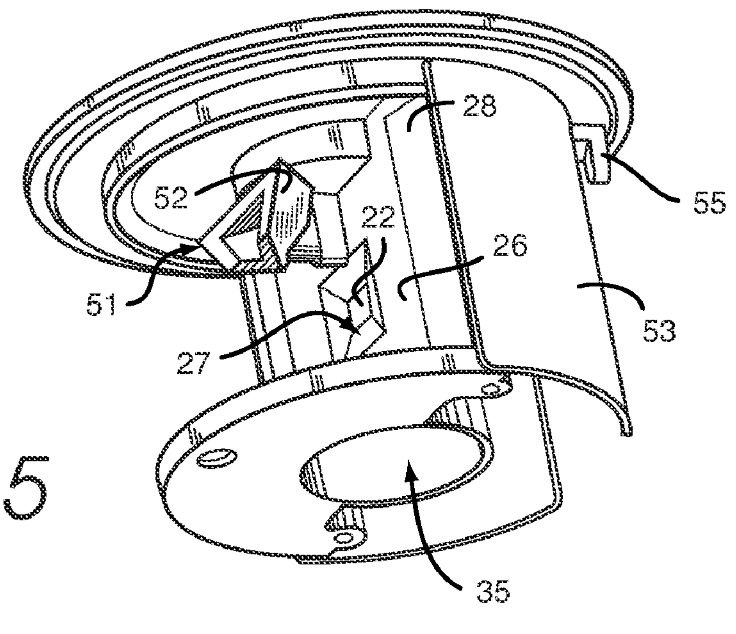
FIG. 5 is a perspective view of the interior of the motion detector housing of FIG. 1 with the outer housing and lens removed to reveal a mirror arrangement for wide angle motion detection.

To achieve a wide-angle field of view having good sideways sensitivity with only a single sensor, a mirror may be used to direct infra-red energy from slots on the far sides to the sensor. FIG. 5 shows such a mirror arrangement. In FIG. 5 the outer wall 16 has been removed to reveal the inner structures of the motion detector, in which like parts are given reference numerals the same as like parts in FIG. 2. A mirror 51 is mounted on the front of partition wall 26. The mirror has two reflecting faces 52, only one of which is visible in FIG. 5, the other face being turned to the opposite side. The face 52 is angled so that infra-red energy coming through a far side slot by the angled partition 28 is reflected to sensor window 22. The edges of partition window 27 have been sloped to avoid shadowing of reflected energy. For best sensitivity it may be desirable to include only a single lenslet in the column aligned with the far side slot so that the optical path of the infra-red energy may be optimized for the detection zone or zones associated with the single lenslet aligned with this slot.

As described thus far, particularly in connection with the mirror of FIG. 5, the motion detector can be configured with a wide field of view having an angular width of 180 degrees or more. In some installations such a wide field of view is not desirable. For example, one side of the field of view may look into a neighboring yard or other area that is not desired to be monitored. To give the motion detector the flexibility to deal with such installations, the motion detector may be provided with movable blinders 53 that can be moved into a position to mask off a portion of one or the other side. Blinders 53 slide in a track 54 formed on the bottom of the motion detector internal support structure just outside the lens mounting. The track is partially visible in FIG. 2 through the slots. The blinders are provided with handles or tabs 55 that extend to the outside of wall 16 in the back. The wall is cut away in the back (see FIG. 2) to provide room for the handles 55 to slide a limited distance. In this way a user may position one or the other blinder, or both, to limit the field of view on the sides.

The above descriptions and drawings are given to illustrate and provide examples of various aspects of the invention in various embodiments. It is not intended to limit the invention only to these examples and illustrations. Given the benefit of the above disclosure, those skilled in the art may be able to devise various modifications and alternate constructions that although differing from the examples disclosed herein nevertheless enjoy the benefits of the invention and fall within the scope of the invention, which is to be defined by the following claims. Any limitation in the claims expressly using the word "means" is intended to be interpreted as a "means plus function" limitation in accordance with Title 35, United States Code, Section 112, and any claim limitation not expressly using the word "means" is not intended to be so interpreted.

What is claimed is:

1. A motion-activated decorative lighting fixture, comprising:

a motion detector housing disposed to form an integral part of the lighting fixture, said housing including a vertically extending exterior wall around said housing, and said wall having an array of elongate vertically extending slots therethrough horizontally spaced apart from one another and extending along at least a portion of said wall;

one or more PIR sensors disposed within said housing;

a segmented Fresnel lens array disposed within said housing to direct infra-red energy from a monitored field of view to said one or more sensors, said lens array including a plurality of columns of lenslets, at least a portion of said columns comprising at least two lenslets disposed one above the other, and each column of said plurality being aligned with a corresponding slot from said array of slots so as to direct infra-red energy from a monitored zone passing through said corresponding slot to said one or more sensors.

2. The lighting fixture of claim 1 wherein each column of said plurality comprises at least two lenslets disposed one above the other.

3. The lighting fixture of claim 1 wherein at least the end columns of said plurality each includes only a single lenslet.

4. The lighting fixture of claim 1 wherein said array of slots has an angular extent around said wall with far side slots of at least about 180 degrees apart; and said lens array is configured to monitor a field of view through said slots at least over said angular extent.

5. The lighting fixture of claim 4 comprising two said sensors disposed to monitor opposite sides of said field of view.

6. The lighting fixture of claim 4 wherein said housing includes a single said sensor and further includes one or more mirror faces disposed to direct infra-red energy from at least the far side slots of said angular extent to said single sensor.

7. The lighting fixture of claim 1 wherein said wall is generally cylindrical of circular cross sectional shape.

8. A motion-activated decorative lighting fixture, comprising:

a motion detector housing disposed to form an integral part of the lighting fixture, said housing including a vertically extending exterior wall around said housing of generally cylindrical shape and having a generally circular cross section, and said wall having an array of elongate vertically extending slots therethrough horizontally spaced apart from one another and extending along at least a portion of said wall;

a printed circuit board disposed within said housing with a single PIR sensor mounted thereon, said PIR having a viewing window and said sensor being mounted so that said viewing window is disposed to look forward;

a segmented Fresnel lens array disposed within said housing to direct infra-red energy from a monitored field of view to said single PIR sensor, said lens array including a plurality of columns of lenslets, a portion of said columns comprising at least two lenslets disposed one above the other, wherein the end columns of said lens array each having only a single lenslet, and each column of said plurality being aligned with a corresponding slot from said array of slots so as to direct infra-red energy from a monitored zone passing through said corresponding slot to said one or more sensors.

* * * * *